United States Patent [19]
Bellenger

[11] Patent Number: 5,949,786
[45] Date of Patent: Sep. 7, 1999

[54] STOCHASTIC CIRCUIT IDENTIFICATION IN A MULTI-PROTOCOL NETWORK SWITCH

[75] Inventor: Donald M. Bellenger, Los Altos Hills, Calif.

[73] Assignee: 3Com Corporation, Santa Clara, Calif.

[21] Appl. No.: 08/724,742

[22] Filed: Oct. 2, 1996

Related U.S. Application Data

[63] Continuation-in-part of application No. 08/698,745, Aug. 16, 1996, Pat. No. 5,802,054.
[51] Int. Cl.⁶ .............................. H04L 12/28; H04L 12/56
[52] U.S. Cl. ................................................................ 370/401
[58] Field of Search ..................................... 370/229, 230, 370/235, 236, 237, 252, 254, 400, 401, 402, 392, 466, 389

[56] References Cited

U.S. PATENT DOCUMENTS

| 5,430,709 | 7/1995 | Galloway | 370/252 |
| 5,434,863 | 7/1995 | Onishi et al. | 370/401 |
| 5,440,564 | 8/1995 | Ovada et al. | 340/827 |
| 5,473,607 | 12/1995 | Hausman et al. | 370/401 |
| 5,708,659 | 1/1998 | Rostoker et al. | 370/392 |

OTHER PUBLICATIONS

Cisco Systems, "Netflow Switching and Services: Extending Today's Internetwork to Meet Tomorrow's Requirements", www.cisco.com/warp/public/733/packet/nfss_ov.htm, Aug 9, 1986.

Cisco Systems, "Netflow Switching Technology and Cisco IOS Services", www.cisco.com/warp/public/733/packet/nfss_ov.htm, Aug. 9, 1986.

Ipsilon, "IP Switching: The Intelligence of Routing, The Performance of Switching", Ipsilon Networks, pp. 1–10, Feb. 1996.

Primary Examiner—Ajit Patel
Attorney, Agent, or Firm—Wilson, Sonsini, Goodrich & Rosati

[57] ABSTRACT

A flow based network switch function is based on a route cache and flow detect logic which generates hash codes for use in accessing the route cache. Flow detect logic is implemented with read-write register functions. A network switch which comprises a port for access to a communication medium to receive incoming frames. A route table memory has a set of accessible locations for storing routing information. The set of accessible locations is addressable in response to N bits, and locations in the set store a tag comprising M bits for identifying a network flow. Routing information is also stored in each of the accessible locations for the identified network flow. Flow detect logic is coupled with a port and monitors frames received by the port generate and N bit address, and an identifying tag comprising M bits for use in accessing the route table memory in response to an incoming frame on the port. Match logic is coupled with the route table memory and the flow detect logic, which accesses a particular location in the set of accessible locations in the route table memory in response to the N bit address, compares the identifying tag with the tag stored in the particular location to determine whether the incoming frame matches the network flow identified by the stored tag, and supplies the routing information for level 3 or higher stored in the particular location if a match occurs. If a match does not occur, a route table miss is indicated, and the frame is forwarded to multi-protocol routing algorithms for the purpose of generating the routing information for the incoming frame.

20 Claims, 5 Drawing Sheets

STOCHASTIC CIRCUIT IDENTIFICATION IN A MULTI-PROTOCOL NETWORK SWITCH

CONTINUING APPLICATION DATA

The present application is a continuation-in-part of my U.S. patent application Ser. No. 08/698,745, filed Aug. 16, 1996, issued as U.S. Pat. No. 5,802,054 on Sep. 1, 1998, entitled ATOMIC NETWORK SWITCH WITH INTEGRATED CIRCUIT SWITCH NODES.

BACKGROUND OF THE INVENTION

1. Field of the Invention

The present invention relates to network intermediate systems; and more particularly to network routers which execute network layer circuit routing for communication systems.

2. Description of Related Art

When a number of networks merge at a common point, network routers or switches are used for the purposes of directing the traffic among the interconnected networks which use a variety of protocols. In typical data networks, frame routing is based on address information that is stored in each frame of data being transmitted in the network. In contrast, telephone networks have typically been implemented based on channels of data specified by information external to the data being transmitted. The network routers used to interconnect networks of different types of protocols have been based on switching techniques and on routing techniques. Switching and routing in this context refer to the process by which the network router determines a new destination for a frame which is received at the router. The difference between switching and routing in the data networking environment arises primarily in a complexity of the equipment.

A data router operates by examining (parsing) each frame of data to decode its address using a microcomputer executing a linear stored program. A data switch in comparison decodes the address information using parallel logic fixed in silicon.

Generally switches implemented in parallel logic operate much faster than routers, which typically depend on serialized logic. The penalty for the increased speed of data switches compared to routers comes from the fact that switches are inflexible in the protocols that they can route.

Typically the simplest level of data addressing is the link-layer ethernet address. This address allows the construction of fairly large bridged networks by means of the Spanning Tree 802.1d bridge protocol. Ultimately the size of these networks is limited to some tens of thousands of addresses. To access larger numbers of addresses (internetworks), a more sophisticated addressing protocol is used. These more robust protocols are generally referred to as network layer or "level 3" protocols. The most common of the level 3 protocols is the Internet Protocol. Although some switches can analyze the most common level 3 protocols, their functionality is generally limited and not as flexible as the analysis available from a router.

In the telephony sense, circuit switching consists of dialing a number or otherwise setting up a circuit. Once the addressing phase is over, no further address information is exchanged. All data follows the circuit established by the initial addressing phase of call setup. This is referred to as connection oriented routing.

Common data transmission is "connectionless" in that each frame carries its own address information. There is no idea of a circuit in data switching. Each frame is examined individually without any reference to the frames preceding it. In practice, however, most data traffic does display circuit-like serial dependencies. This temporal locality of reference, referred to as flows, can be used to construct cache mechanisms to exploit this effect.

An example of circuit dependency is in the transmission of a data file. Such a file may consist of thousands of frames of data all identically addressed. All of the frames of the file transfer will also follow each other during a burst of activity. During this burst, each frame will be examined by a router as if each frame were completely unrelated, even though the router may have just routed many identical frames. This constant repetition of an inefficient linear stored program to calculate already known results is a huge waste of resources.

There have been some products aimed at this problem. The "Net-Flow Switch" offered by Cisco Systems, Inc. of San Jose, Calif. does some circuit caching, but the caching is executed in software. The Ipsilon flow switch offered by Ipsilon Networks of Palo Alto, Calif. is also strongly based on circuit detection. 3Com Corporation of Santa Clara, Calif. offers High Function Switching which does some level 3 switching in silicon.

The central issue with level 3 switching is the complexity of the hardware parser. In the simple link-layer switches, the address information is found in fixed locations. This makes it possible to read the address information with hard-wired logic gates. In level 3, there are many variants of the address fields. It is much more difficult to design parallel logic which can follow these varying formats. Some of these variants are: Ethernet, 802.3, IP, SNAP, 4 subvariants of IPX, Apple Talk, and many others. The typical approach is to build parsers for the most common types of traffic, and bridge or slow-route the less common types.

Accordingly, it is desirable to provide a fast network flow switching technique which is adaptable to wide variety of protocols, and improves performance of present multi-protocol network switches and routers.

SUMMARY OF THE INVENTION

The present invention provides a flow based network switch based on a route cache, and flow detect logic which generates hash codes for use in accessing the route cache. Flow detect logic, according to one aspect of the invention, is implemented with read-write register functions, effectively taking the network layer protocol dependent functions out of the logic that is permanently fixed in silicon in the prior art, in order to provide an adaptable network switch system.

Accordingly, the present invention can be characterized as a network switch which comprises a port for access to a communication medium to receive incoming frames. A route table memory has a set of accessible locations for storing routing information. The set of accessible locations is addressable in response to N bits, and locations in the set store a tag comprising M bits for identifying a network flow. Routing information is also stored in each of the accessible locations for the identified network flow. Flow detect logic is coupled with the port and monitors frames received by the port, and generates a N bit address, and an identifying tag comprising M bits for use in accessing the route table memory in response to an incoming frame on the port. Match logic is coupled with the route table memory and the flow detect logic, which accesses a particular location in the set of accessible locations in the route table memory in response to the N bit address, compares the identifying tag with the tag stored in the particular location to determine whether the incoming frame matches the network flow identified by the stored tag, and supplies the routing information stored in the particular location if a match occurs. If a match does not occur, a route table miss is indicated, and the frame is forwarded to multi-protocol routing algorithms for the purpose of generating the routing information for the incoming frame.

The use of hash codes provides efficient utilization of, and access to, the route table memory. Furthermore, such techniques are very simple to implement in hardware. However, it is commonly believed that a hash function alone cannot be reliably used to route frames because there is a possibility that a frame will be randomly mis-routed. According the present invention, a hashing technique is used reliably to route data frames, independent of layer three details. The hashing technique is implemented with logic that computes a hash value in response to a set of control fields in the incoming frame. The set of control fields used for generating the hash value correlates with a network frame format which may be encountered in the network to which the network routers coupled. The hash value comprises a pseudo-random number that is seeded in response to the set of control fields in the incoming frame. According to one aspect of the present invention, it is very unlikely that frame will be randomly mis-routed due to the chance that two different input patterns will result in the same hash code. In particular, according to this aspect of the invention, the hash value used in accessing the route table memory comprises 32 bits or more. According to another aspect of the invention, the hash value for accessing the route table memory, comprises 64 bits or more.

According to another aspect of the invention, the flow detect logic includes a plurality of flow detect filters which include respective template registers. The template registers are read-write registers that store a mask for a particular network frame format, and logic applying the mask to the incoming frame to generate a hash seed value from the incoming frame. A pseudo-random number generator is responsive to the hash seed value to generate a hash code. A selector is coupled with a plurality of flow detect filters to select a hash code for use in accessing the route table memory.

The plurality of flow detect filters, according to alternative embodiments, also include a read-write protocol filter register which stores a protocol filter identifying a protocol for which the template register is adapted, and mask enable logic which is responsive to the protocol filter to enable the logic applying the mask in response to processing of the incoming frame with the protocol filter. In addition, a read-write protocol hierarchy register is included which stores a protocol hierarchy value identifying a priority for the protocol for which the template register is adapted. The selector is responsive to the protocol hierarchy for selecting the output of one of the plurality of flow detect filters for use in generating the hash value.

In sum, the present invention provides a technique for using a route table memory in combination with network flow detect logic in a high performance network switch. The flow detect logic includes read-write registers for specifying the filtering used. Pseudo-random numbers are used as hash values in accessing the cache. Thus, a highly adaptable network switch architecture is provided which routes frames with high reliability and high performance.

Other aspects and advantages of the present invention can be seen upon review of the figures, the detailed description and the claims which follow.

DETAILED DESCRIPTION

Figure 1:
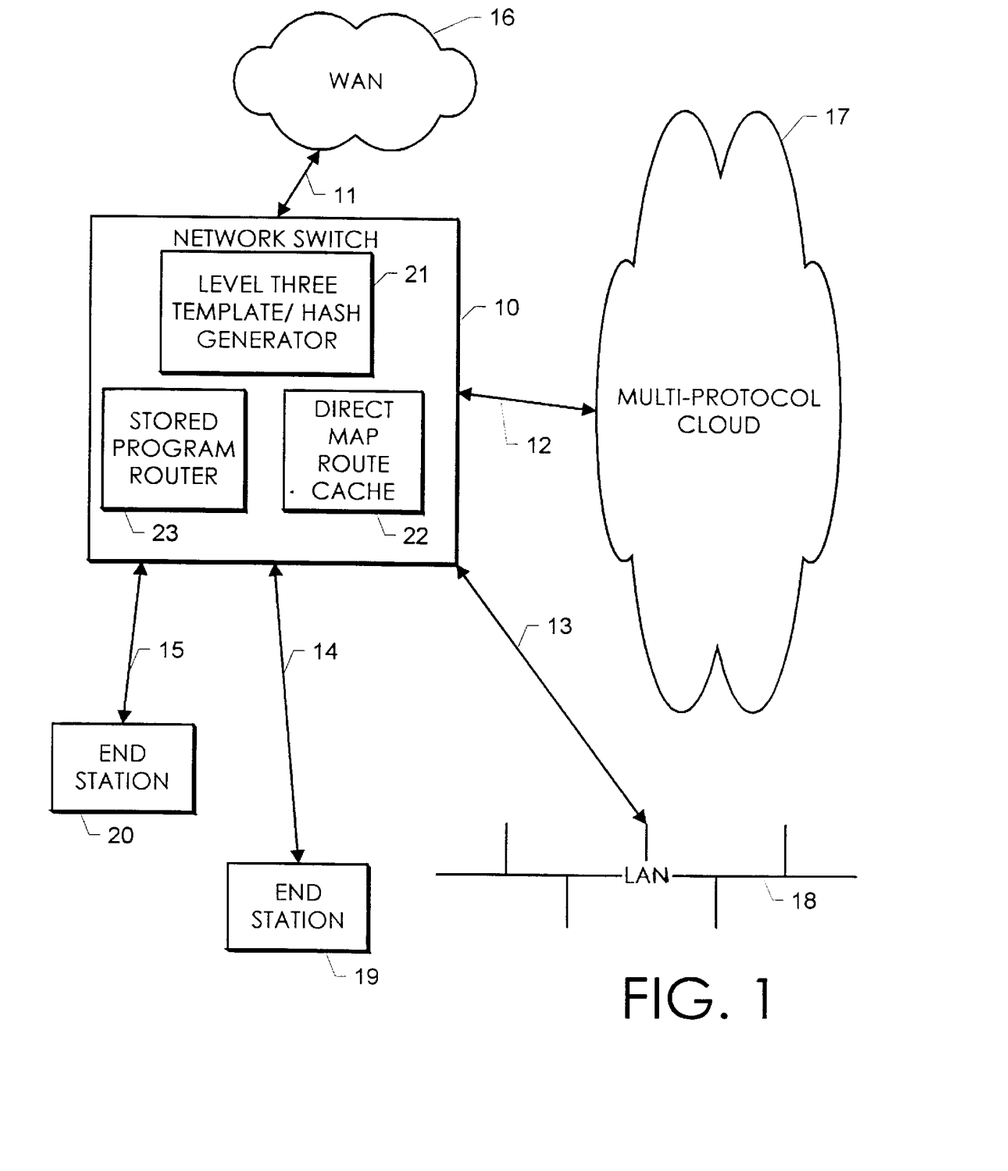
FIG. 1 is a simplified block diagram of a network including a network switch with a route cache according to the present invention.

A detailed description of preferred embodiments of the present invention is described with reference to FIGS. 1–6. In FIG. 1, a context of the present invention is illustrated. In particular, a network switch 10 includes a plurality of ports 11, 12, 13, 14, 15 which are coupled to a variety of network communication media. Thus, port 11 in the figure is coupled to a wide area network 16. Port 12 is coupled to a multi-protocol cloud 17, such as the internet. Port 13 is coupled to a local area network 18. Ports 14 and 15 are coupled to respective end stations 19 and 20. According to the present invention, the network switch 10 includes a level 3 template/hash generator 21, a route cache 22, and a stored program router 23. As discussed in more detail below, in operation the network switch 10 monitors incoming frames on a port, such as port 12. Incoming frames are supplied to the level 3 template/hash generator 21, at which a pseudo-random number is generated corresponding to the incoming frame. The pseudo-random number is used for accessing the route cache 22. If a match is found in the route cache 22, then the routing information from the route cache is used for routing the incoming frame as appropriate. If the route cache 22 does not have an entry which matches the incoming frame, then the frame is processed by the stored program router 23 to produce routing information as necessary.

Figure 2:
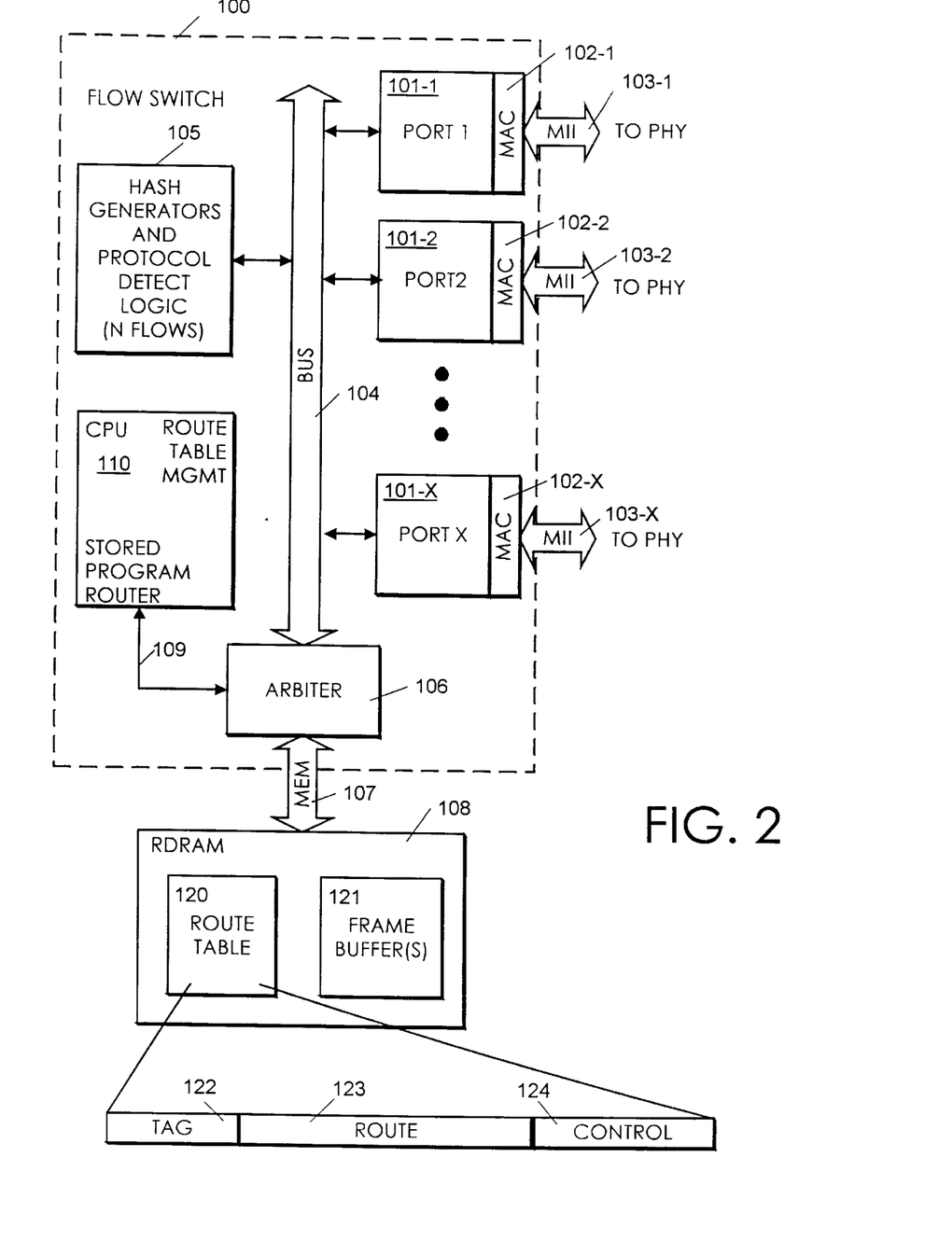
FIG. 2 is a more detailed block diagram of an integrated circuit flow switch architecture for use in the system of FIG. 1.

FIG. 2 provides a more detailed diagram of the hardware utilized in the network router 10 according to one embodiment of the present invention. Thus, in FIG. 2, a flow switch integrated circuit 100 is shown. The flow switch integrated circuit 100 includes a plurality of ports 101-1, 101-2, 101-x. Each of the ports 101-1 through 101-x includes a medium access control block 102-1, 102-2, 102-x. The medium access control blocks 102-1 through 102-x are coupled to physical media through, in this example, media independent interfaces 103-1, 103-2, 103-x.

Each of the ports, 101-1 through 101-x is coupled to a bus 104. The bus 104 is coupled to a flow detect logic block 105 which includes hash generators and protocol detect logic for a plurality of network flows. In addition, the bus 104 is coupled to a bus arbiter 106. The bus arbiter 106 provides a memory interface 107 to off-chip memory 108, such as Rambus dynamic random access memory RDRAM. In addition, the arbiter 106 provides an interface 109 to a host CPU 110. The host CPU 110 executes route table management software, and stored program router software in one embodiment of the present invention. In alternative systems, the stored program router software is provided by an additional CPU or host processing system which is coupled to the flow switch 100 across a backplane, not shown, or at an end station, such an end station coupled to port 101-2.

The memory 108 stores a route table 120 and frame buffers 121. The route table 120 includes a plurality of accessible memory locations, which are accessed in response to a set of N bits taken from the hash provided by the flow detect logic 105. Each entry in the route table 120 includes a tag field 122, a route information field 123, and control fields 124. The tag field as explained in more detail below, stores M bits, which are used in combination with the N bit address for providing unique identification of the network flow for which the routing information in field 123 is provided. The control field 124 is used for cache aging and other processes as known in the art.

Figure 3:
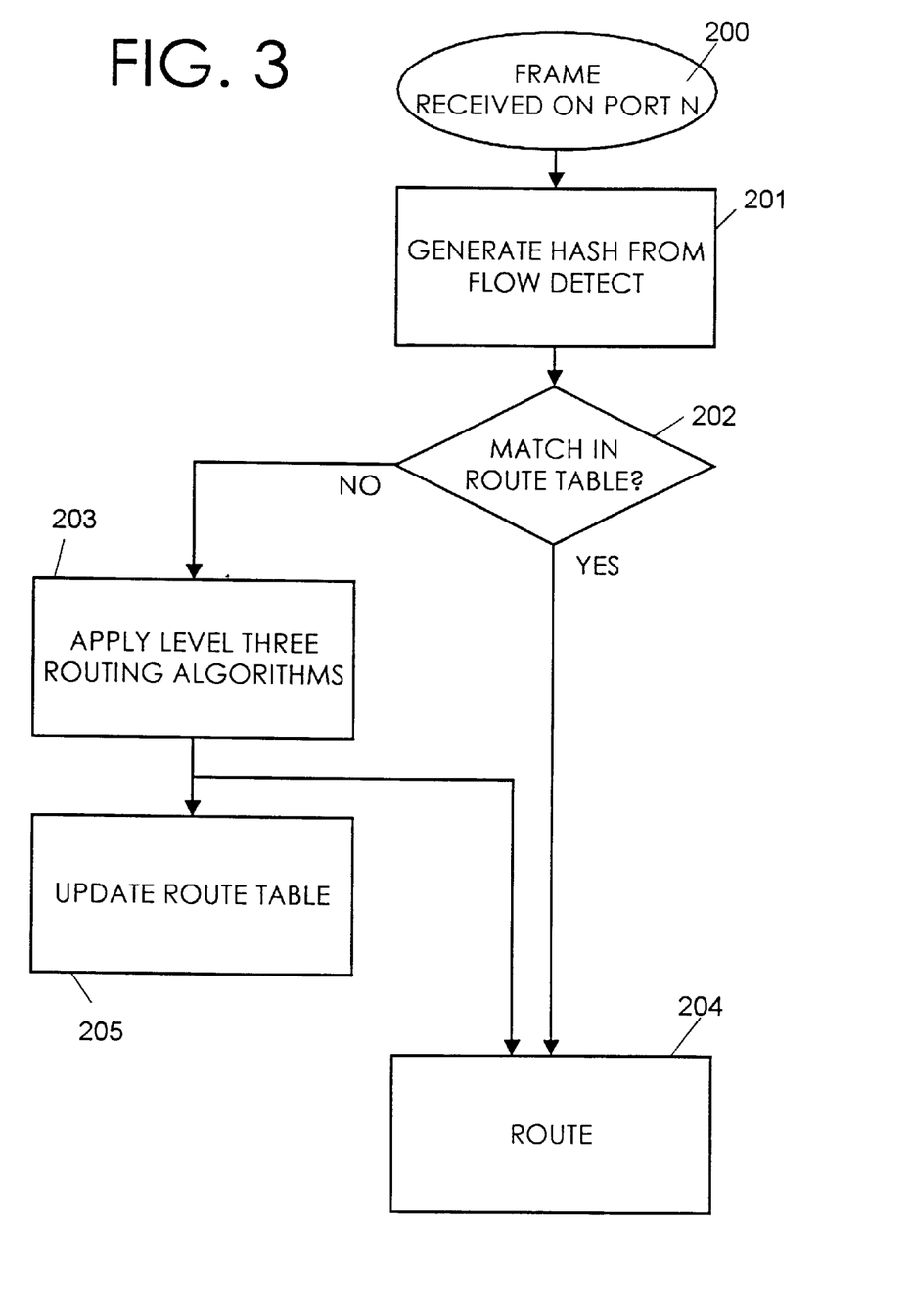
FIG. 3 is a flow chart for the basic switching algorithm according to the present invention.

FIG. 3 illustrates the process executed in the system of FIGS. 1 or 2 according to the present invention. Thus, as shown in FIG. 3 an incoming frame is received on a port (block 200). The incoming frame is supplied to the flow detect logic 105 from which a hash code is generated (block 201). The hash code is used for accessing the route table 120, and the accessed entry is used to determine whether a match is found (block 202). If a match is not found, then level 3 routing algorithms are applied to the incoming frame (block 203), and the frame is routed (block 204). However, if a match is found in the table at block 202, then it is directly routed using the routing information from the table.

Also, if the level 3 routing algorithms are applied as illustrated at block 203, then the route table is updated (block 205). The techniques used for updating the route table involve first determining whether sufficient traffic of a particular flow is occurring in the network. If sufficient traffic is occurring, then an entry is added to the route table for the flow. The step of determining whether sufficient traffic is occurring can be a simple threshold process, or every new route may be added to the route table memory 204 as it occurs, with the oldest entry in the table or the least recently used entry in the table replaced with the new entry.

Figures 4, 5:
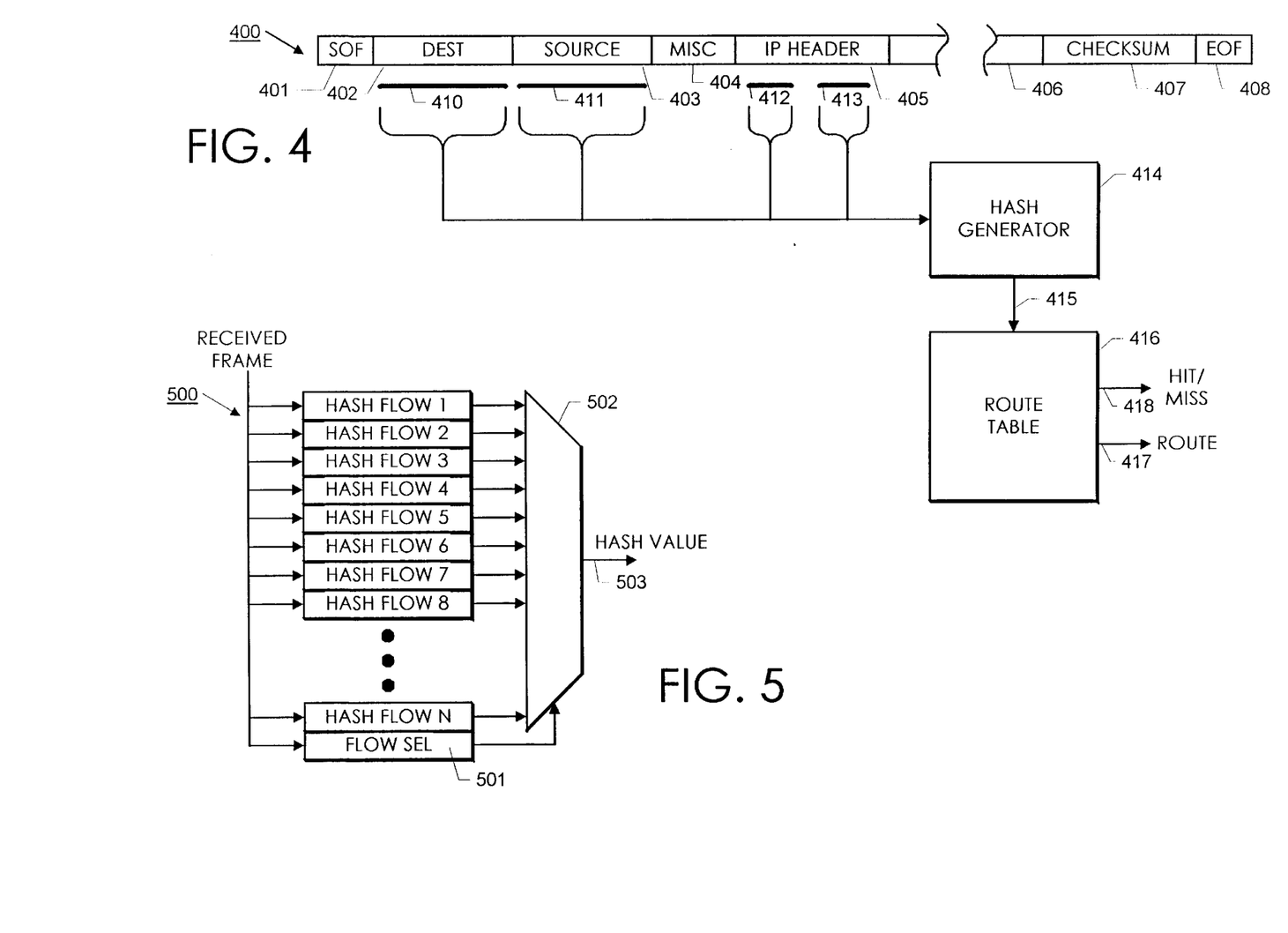
FIG. 4 is a diagram illustrating the process of generating identifying tags based on pseudo-random number generators for the flow detect logic in the system of FIGS. 1 and 2.
FIG. 5 is a simplified block diagram of flow detect logic for multiple parallel flows for use in the system of FIGS. 1 and 2.

FIG. 4 illustrates the technique executed by the flow detect logic in generating an identifying tag for the frame being received. FIG. 4 includes the format of a standard Ethernet (802.3) style frame 400. The frame includes a start of frame deliminator SOF in field 401. A destination address is carried in field 402. A source address is carried in field 403, and miscellaneous control information is carried in additional fields 404. A network layer header, such as an Internet protocol header in this example, is found in field 405. Other style network layer headers could be used depending on the particular frame format. The data field of variable length is found at section 406 of the frame. The end of the frame includes a CRC-type checksum field 407 and an end-of-frame deliminator 408. The flow detect logic runs a pseudo-random hash algorithm over selected fields in the control header of the frame to generate a pseudo-random tag. Thus, the field 410, the field 411, the field 412, and the field 413 are selected for input into a hash generator 414. The tag generated by the hash generator 414 is supplied on line 415 for use in accessing the route table 416. The route table either supplies route information on line 417, or indicates a miss on line 418.

The embodiment of FIG. 4 selects a particular set of fields within the frame for the purpose of generating the pseudo-random tag. The particular set of fields is selected to correspond to one standard frame format encountered in the network. However, a variety of frame formats may be transmitted within a single Ethernet style of network.

In one example, a CRC-type hash generator 414 is utilized, relying on typical CRC-type algorithms, referred to as polynomial arithmetic, modulo II. This type of arithmetic is also referred to as "binary arithmetic with no carry" or serial shift exclusive-OR feedback. However, a variety of pseudo-random number generation techniques can be utilized, other than CRC-like algorithms. The two primary aspects needed for a suitable pseudo-random hash code are width and chaos, where width is the number of bits in the hash code, which is critical to prevent errors caused by the occurrence of frames which are unrelated but nonetheless result in the same hash being generated, and chaos is based on the ability to produce a number in the hash register that is unrelated to previous values.

Also, according to the present invention, the parsing of the frames incoming for the purposes of producing an address to the look-up table can take other approaches. This parsing can be referred to as circuit identification, because it is intended to generate a number that is unique to the particular path of the incoming frame.

The flow detect logic in a preferred system executes a plurality of hash flow analyses in parallel as illustrated by FIG. 5. Thus in FIG. 5, a received frame is supplied on line 500 in parallel to hash flow logic 1 through hash flow logic N, each flow corresponding to a particular frame format. Also, the received frame is supplied to a hash flow "select" 501 which is used for selecting one of the N flows. The output of flows 1 through N are supplied through multiplexer 502 in FIG. 5, which is controlled by the output of the select flow 501. The output of the select flow 501 causes selection of a single flow on line 503, which is used as a hash value for accessing the route table by the CPU.

Thus a preferred embodiment of the present invention uses a switching technique base on flow signatures. Individual frames of data move from one of the Ethernet ports to a shared buffer memory at the node. As the data is being moved from the input port to the buffer, a series of hash codes is computed for various sections of the input data stream. Which bits are or are not included in each hash calculation is determined by a stored vector in a vector register corresponding to that calculation. For example, in the most common case of an IP frame, the hash function starts at the 96th bit to find the "0800" code following the link-layer source address, it then includes the "45" code, 32 bits of IP source, 32 bits of IP destination, skips to protocol ID 8 bits, and then at byte 20 takes the source port 16 bits and the destination port 16 bits. The result is a 64 bit random number identifying this particular IP flow.

The hash code is looked up in or used to access local memory. If the code is found, it means that this flow type has been analyzed previously, and the node will know to apply the same routing as applied to the rest of the flow. If there is no entry corresponding to this hash code, it means that the flow has not been seen lately, and the node will route the frame to a default destination or using a stored program router. A least recently used algorithm, or other cache replacement scheme, is used to age flow entries out of the local tables.

In practice, many filters operate simultaneously. For example, filters may be defined for basic bridging, IP routing, sub-variants, Apple Talk, and so on. The actual limit to the number of filters is determined by the available space on the ASIC or otherwise available in the system. The logic of the filters is basically the same for all the filters. The actual function of each filter is defined by a vector register specifying which bits are detected.

A flow effectively defines a "circuit" or a "connection"; however, in standard Ethernet design, frames are treated individually without any regard to a connection. Typically a router will analyze every single frame as if it had never seen it before, even though the router might have just processed thousands of identical frames. This is obviously a huge waste of routing resources. The automation of this flow analysis with multiple levels of parallel and cascaded hashing algorithms combined with a default router is believed to be a significant improvement over existing switching methods.

Figure 6:
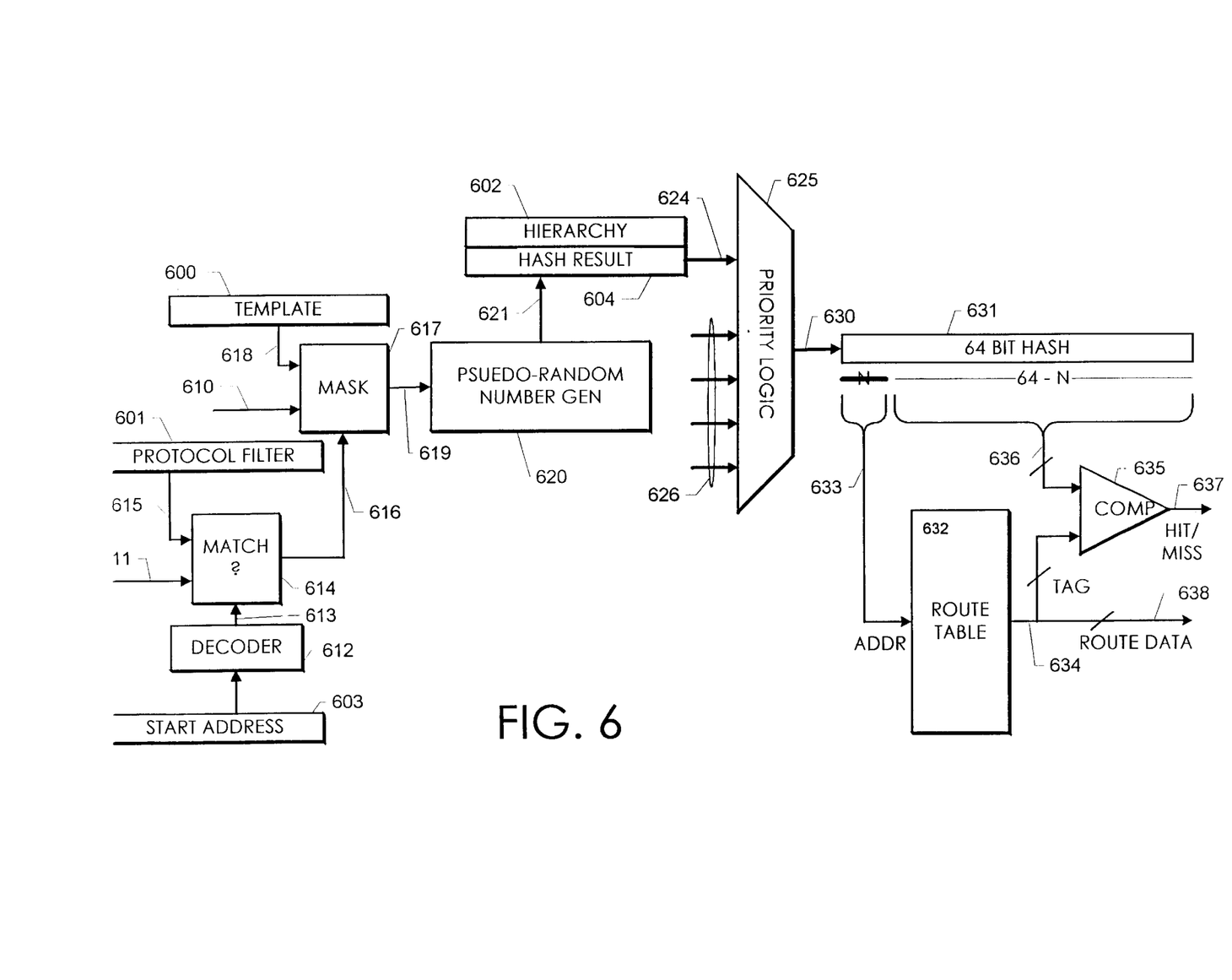
FIG. 6 is logic diagram illustrating a structure of a flow detect filter and route table memory according to the present invention.

FIG. 6 illustrates a preferred hardware architecture for implementing the flow detect filters and the route table accessing logic according to the present invention. Thus, flow detect logic includes a plurality of flow detect filters. Each filter includes a template register 600 which specifies bytes of an incoming frame which are to be used as a hash seed for the generation of the hash code. The template stored in register 600 specifies all protocol dependent fields for a particular protocol. The fields are not distinguished in the template register 600 beyond indicating whether they are included as a seed for the hash or not. As the frame is processed, each byte in the initial header of the frame is either included in the hash function seed or it is ignored. A second register 601 is included that is loaded with a filter that detects a specific protocol type represented by the template stored in the template register 600. The protocol filter 601 is used for returning a Boolean true or false condition based on a string compare to a section of the incoming frame.

A third register 602 in the filter is loaded with a hierarchy number which is used to arbitrate among similar protocols which might simultaneously appear to be true based on the protocol filter register 601. An optional fourth register 603 is included that provides a start address for enabling and disabling the filter.

A result register 604 is included which stores the pseudo-random result generated for the incoming flow.

A start address 603 is supplied in order to enable the filter. The incoming data frame is supplied on lines 610 and 611 for the logic of FIG. 6. A decoder 612 is coupled to the start address register 603. If the start address decoder 612 indicates a match, then the filter is enabled by the signal on line 613 which is applied to protocol match logic 614. The protocol match logic 614 receives the incoming frame on line 611, and the protocol filter data on line 615. If the protocol match logic 614 indicates a match, then a signal on line 616 is used to enable the mask logic 617. The mask logic 617 receives the template from the template register 600 on line 618, and the incoming frame on line 610. A pseudo-random seed value 619 is generated by the mask 617 for supply to a pseudo-random number generator 620. The pseudo-random number generator 620 supplies a hash code on line 621 to the hash result register 604. The output of the filter is supplied on line 624 from the result register 604 and hierarchy register 602 to priority logic 625. Other inputs to the priority logic 625 are indicated on lines 626. Each of these lines 626 is coupled to a filter similar to that coupled to line 624.

The selected hash value is provided on line 630 as a hash value 631 used for accessing the route table 632. N bits of the hash value 631 are supplied on line 633 as an address to the route table. The addressed location in the route table is read onto line 634. The tag field is supplied to a comparator 635. The other input of the comparator 635 is the M bits of the hash value on line 636. The output of the comparator 635 is a route table hit or miss signal on line 637. The route information is supplied on line 638 for use in routing the incoming frame in the event a cache hit occurs.

In a preferred hashing technique as shown in FIG. 6, the hardware on the flow switch includes at least a template register, pseudo-random number generation logic and a pseudo-random result register. The template register is loaded to specify bytes of a subject frame to be included in the hash code. The template specifies all protocol-dependent fields for a particular protocol. The fields are not distinguished beyond whether they are included in the hash or not. As the frame is processed, each byte of the initial header is either included in the hash function or it is ignored, based on the template. A hash function is generated based on the incoming frame and the template. The pseudo-random number generator is seeded by the input hash bits selected by the template. The change of a single bit in the input stream should cause a completely unrelated random number to be generated. Most common algorithms for generating pseudo-random numbers are linear-congruential, and polynomial shift methods known in the art. Of course, other pseudo-random number generation techniques are available.

A first field of the pseudo-random number is used as an address for the look-up table. The number of bits in this field depends on the dimensions of the look-up table. For example, if the circuit table has 64,000 possible entries, and the hash number is eight bytes long, the first two bytes are used as an address. The other six bytes are stored as a key in the hash table. If the key in the hash table matches the key in the hash code, then the circuit is identified. The additional bytes in the table for the addressed entry specify the route to be applied. The length of the pseudo-random hash code is critical, to account for the probability that two unrelated frames will result in the same hash number being generated. The required length depends on the size of the routing tables, and the rate of turnover of routes.

The problem with a pure hash code circuit identification technique is that there is a chance of randomly misrouting a frame. The problem arises when you are generating random numbers out of a larger set. There is a chance that two different input patterns will produce the same hash code. Typically, a hash code will be loaded into a table with a known route. Then a second, different, frame will appear that reduces to the same hash code as the one already in the table. The second frame will be falsely identified as having a known route, and will be sent to the wrong address. The exact mechanism of this error can be understood by the well-known statistics of the "birthday problem." The "birthday problem" answers the question, "What is the probability that two people in a group will have the same birthday?" It turns out that the number of people in a group required for there to be a likelihood of two people having the same birthday is quite small. For example, there is a 50% chance that two people out of a group of 23 will have the same birthday.

The probability of a switching error depends on the number of circuits active. For example, if there are no circuits active, then there is no chance that an invalid circuit will be confused with another circuit, since there are no valid circuits. As each circuit is added to the table, it decreases the remaining available space for other numbers by approximately $(½)^{bits}$, where "bits" is the number of bits in the hash code. If the hash code is 32 bits long, then each entry into the circuit table will reduce the remaining code space by $(½)^{32}$, which is equal to $2.32 \times 10^{-10}$. The cumulative probability of not making an error in the circuit table is equal to the product of the individual entry errors up to the size of the table. This is $(1)*(1\frac{1}{2}^{32})*(1\frac{2}{2}^{32})*(1\frac{3}{2}^{32}) \ldots *(1-n/2^{32})$, where n is the number of entries in the table. In the case of a 32-bit hash code, and an 8,000-entry circuit table, the probability of making an error in the table would be about 0.7%. With a 64,000-entry circuit table, the probability of an error would be about 39%.

Using a 32-bit hash code and some typical-sized circuit tables indicates that the conventional wisdom is correct. That is, there will be routing errors if only a 32-bit hash code is used. However, if the number of bits in the hash code is increased and probability is recalculated for typical-sized circuit tables, we find that the probability of error quickly approaches zero for hash codes just slightly longer than 32 bits. For example, an 8,000-entry table with a 40-bit hash code will reduce the error rate to 0.003%. A 48-bit hash code will reduce the error to 0.000012%. These calculations show that a pure hash code look-up table can be used if the length of the hash code is longer than 32 bits for typical-size tables.

As a further example, consider the case of a 64-bit hash code. Assuming an 8,000-entry table, the probability of making an error is $2*10^{-12}$. Even if the table is completely replaced with new entries every 24 hours, it would take over one billion years for an error to occur. Using a 64-bit hash code with a 64,000-entry table would give a probability of error of $10^{-10}$. Assuming the table turned over every day, it would take about 28 million years for an error to occur. An error might occur sooner, but the rate would be negligible. In all cases, there is no realistic chance of making an error based on this routing technique within the lifetime of typical networking equipment.

In a preferred embodiment, filtering mechanisms are implemented on the flow switch integrated circuit, and multiple filters operate in parallel. The circuit look-up table is implemented with external memory much larger than the number of circuits expected to be simultaneously active. This means that the hash pointer generated either points to a valid key or a miss is assumed. There is no linear search for matching key. When a circuit is not found in the table, the frame is routed to a default address. Normally, this default address directs the frame to a stored program router. The router will then parse the frame using standard methods, and then communicate with the flow switch circuit to update the circuit table with the correct entry. All subsequent frames are directly routed by the switch element without further assistance from the router.

Example template organizations for the bridging embodiment, the IP routing embodiment, and the IPX routing embodiment are set forth below.

Example for Bridging

Basic ethernet frame: Preamble 64 bits are discarded

DestinationAddress: bytes 1–6 Used

SourceAddress: bytes 7–12 Used

Frame Type: bytes 13–14 are ignored (802.3 length)

Data bytes: 15 up to 60 are ignored

CRC: Last 4 bytes are ignored

The template register is 8 bytes long. Each bit specifies one byte of the header. The first bit corresponds to byte 1 of the DestinationAddress.

The template for bridging is FF-F0-00-00 00-00-00-00

The selector is: Always TRUE. Hierarchy=1 (default to bridging)

Example for IP

| Preamble 64 bits are discarded | | |
|---|---|---|
| Destination | bytes 1–6 | optional |
| Source | bytes 7–12 | optional |
| Frame type | bytes 13–14 | Ignore (802.3 length) |
| byte 15: | IP byte 1 | = version length = optional |
| byte 16: | IP byte 2 | = service type = Ignore |
| 17–18: | IP 3–4 | = length = Ignore |
| 19–22: | IP 5–8 | = Ignore |
| 23 | IP 9 | = TTL = optional |
| 24 | IP 10 | = Proto = optional |
| 25–26 | IP 11–12 | = Hdr chksum = Ignore |
| 27–30 | IP 13–16 | = Source IP address = Used |
| 31–34 | IP 17–20 | = Destination IP address = Used |
| 35- | IP21- | = Ignore |

Assume that optional fields are included in the pseudo-random hash code.

The template would then be: FF-F2-03-03 FC-00-00-00

The selector is: Bytes 13-15=080045, Hierarchy=2

Example for IPX in an Ethernet Frame

| Preamble 64 bits are discarded | | |
|---|---|---|
| Destination | bytes 1–6 | Optional |
| Source | bytes 7–12 | Optional |
| Type | bytes 13–14 | Optional (Selector = 8137) |
| byte | IPX | |
| 15–16 | 1–2 Checksum | Ignore |
| 17–18 | 3–4 Length | Ignore |
| 19 | 5 Hop count | Optional |
| 20 | 6 Type | Optional (Selector = 2 or 4) |
| 21–24 | 7–10 Dest Net | Use |
| 25–30 | 11–16 Dest Host | Use |
| 31–32 | 17–18 Dest Socket | Ignore |
| 33–36 | 19–22 Src Net | Use |
| 37–42 | 23–28 Src Host | Use |
| 43- | 29- | Ignore |
| Template (with optional fields): | | FF-FC-3F-FC FF-C0-00-00 |
| Selector: | Bytes 13–14 = 8137, | Hierarchy = 2 |

The examples shown are representative, and may not correspond to what would actually be required for any particular application. There are many protocol pattern possibilities. Some combinations may not be resolvable with the hierarchy described in these three examples.

The filters can be reprogrammed on the fly to support the exact types of traffic encountered. Furthermore, the filters may operate in a pipeline mode along a series of switching nodes. Each protocol returns its hierarchy number when that filter detects the protocol pattern contained in the template. For example, bridging protocol may be defined as true for hierarchy 1 for all frames. If no stronger filter fires, such as an IP or IPX filter, then the bridging filter will be selected as the default.

Accordingly, the present invention provides an architecture that allows moving the level 3 protocol dependent functions out of logic permanently fixed in silicon, and replacing it with protocol independent programmable register functions. A route cache technique is utilized relying on the unique ability of hash codes to remove position sensitivity. Furthermore, this hash code implementation according to the present invention is simple to implement in hardware while providing a low cost, high performance network switch architecture.

The foregoing description of a preferred embodiment of the invention has been presented for purposes of illustration and description. It is not intended to be exhaustive or to limit the invention to the precise forms disclosed. Obviously, many modifications and variations will be apparent to practitioners skilled in this art. It is intended that the scope of the invention be defined by the following claims and their equivalents.

What is claimed is:

1. A network switch, comprising:
   a port for access to a communication medium to receive incoming frames having particular frame formats;
   route table memory having a set of accessible locations for storing routing information, the set of accessible locations being addressable in response to N bits, and locations in the set storing a tag comprising M bits for identifying a network flow, and storing routing information for the network flow;
   flow detect logic, coupled with the port, which monitors frames received by the port and generates an N bit address and an identifying tag comprising M bits for use in accessing the route table memory in response to the particular frame format of an incoming frame; and
   match logic, coupled with the route table memory and the flow detect logic, which accesses a particular location in the set of accessible locations in the route table memory in response to the N bit address, compares the identifying tag with the tag stored in the particular location to determine whether the incoming frame matches the network flow identified by the stored tag, and supplies the routing information stored in the particular location if a match occurs, else signals a route table miss.

2. The network switch of claim 1, wherein M plus N is 32 or greater.

3. The network switch of claim 1, wherein M plus N is 64 or greater.

4. The network switch of claim 1, wherein the flow detect logic includes:
   logic, coupled with the port, which computes a hash value in response to a set of control fields in the incoming frame, where the set of control fields correlates with a network frame format, and applies N bits of the hash value as the N bit address, and M bits of the hash value as the identifying tag.

5. The network switch of claim 4, wherein the hash value comprises a pseudo random number seeded in response to the set of control fields in the incoming frame.

6. The network switch of claim 1, including:
   logic, coupled with the match logic, for applying routing algorithms to generate route information for the incoming frame for use if a route table miss occurs.

7. The network switch of claim 1, wherein the incoming frame has a data link layer format and a network layer format, and said routing information stored in the set of accessible locations of the route table memory comprises routing information at the network layer.

8. A network switch comprising:
   a port for access to a communication medium to receive incoming frames;
   route table memory having a set of accessible locations for storing routing information, the set of accessible locations being addressable in response to N bits, and locations in the set storing a tag comprising M bits for identifying a network flow, and storing routing information for the network flow;
   flow detect logic coupled with the port, which monitors frames received by the port and generates an N bit address and an identifying tag comprising M bits for use in accessing the route table memory in response to an incoming frame;
   match logic, coupled with the route table memory and the flow detect logic, which accesses a particular location in the set of accessible locations in the route table memory in response to the N bit address, compares the identifying tag with the tag stored in the particular location to determine whether the incoming frame matches the network flow identified by the stored tag, and supplies the routing information stored in the particular location if a match occurs, else signals a route table miss,
   a plurality of flow detect filters, the flow detect filters including respectively a template register which stores a mask for a particular network frame format, and logic applying the mask to the incoming frame to generate a hash seed value from the incoming frame, and a pseudo random number generator responsive to the hash seed which generates a hash; and
   a selector, coupled with the plurality of flow detect filters, which selects a hash from the plurality of flow detect filters as the hash value, and applies N bits of the hash value as the N bit address, and M bits of the hash value as the identifying tag for the match logic.

9. The network switch of claim 8, wherein said template register comprises a read/write register.

10. The network switch of claim 8, wherein a flow detect filter in said plurality of flow detect filters includes:
    a read/write protocol filter register which stores a protocol filter identifying a protocol for which the template register is adapted; and
    mask enable logic responsive to the protocol filter which enables the logic applying the mask in response to processing the incoming frame with the protocol filter.

11. The network switch of claim 8, wherein a flow detect filter in said plurality of flow detect filters includes:
    a read/write protocol hierarchy register which stores a protocol hierarchy value identifying a priority for the protocol for which the template register is adapted; and
    wherein the selector is responsive to the protocol hierarchy.

12. The network switch of claim 8, wherein a flow detect filter in said plurality of flow detect filters includes:
    a read/write protocol filter register which stores a protocol filter identifying a protocol for which the template register is adapted;
    mask enable logic responsive to the protocol filter which enables the logic applying the mask in response to processing the incoming frame with the protocol filter;
    a read/write protocol hierarchy register which stores a protocol hierarchy value identifying a priority for the protocol for which the template register is adapted; and
    wherein the selector is responsive to the protocol hierarchy.

13. A network switch, comprising:
    a port for access to a communication medium to receive incoming frames having a data link layer format and a network layer format;
    route table memory having a set of accessible locations for storing routing information, the set of accessible locations being addressable in response to N bits, and locations in the set storing a tag comprising M bits for identifying a network flow, and storing network layer routing information for the network flow;
    a plurality of flow detect filters, the flow detect filters including respectively a read/write template register which stores a mask for a particular network frame format, and logic applying the mask to the incoming frame to generate a hash seed value from the incoming frame, and a pseudo random number generator responsive to the hash seed which generates a hash;

a selector, coupled with the plurality of flow detect filters, which selects a hash from the plurality of flow detect filters as a hash value, and applies N bits of the hash value as an N bit address, and M bits of the hash value as an identifying tag for use in accessing the route table memory in response to an incoming frame; and match logic, coupled with the route table memory and the flow detect logic, which accesses a particular location in the set of accessible locations in the route table memory in response to the N bit address, compares the identifying tag with the tag stored in the particular location to determine whether the incoming frame matches the network flow identified by the stored tag, and supplies the routing information stored in the particular location if a match occurs, else signals a route table miss.

14. The network switch of claim 13, wherein a flow detect filter in said plurality of flow detect filters includes:

a read/write protocol filter register which stores a protocol filter identifying a protocol for which the template register is adapted; and mask enable logic responsive to the protocol filter which enables the logic applying the mask in response to processing the incoming frame with the protocol filter.

15. The network switch of claim 13, wherein a flow detect filter in said plurality of flow detect filters includes:

a read/write protocol hierarchy register which stores a protocol hierarchy value identifying a priority for the protocol for which the template register is adapted; and wherein the selector is responsive to the protocol hierarchy.

16. The network switch of claim 13, wherein a flow detect filter in said plurality of flow detect filters includes:

a read/write protocol filter register which stores a protocol filter identifying a protocol for which the template register is adapted;

mask enable logic responsive to the protocol filter which enables the logic applying the mask in response to processing the incoming frame with the protocol filter;

a read/write protocol hierarchy register which stores a protocol hierarchy value identifying a priority for the protocol for which the template register is adapted; and wherein the selector is responsive to the protocol hierarchy.

17. The network switch of claim 13, wherein M plus N is 32 or greater.

18. The network switch of claim 13, wherein M plus N is 64 or greater.

19. A network switch, comprising:

a port for access to a communication medium to receive incoming frames having a data link layer format and a network layer format;

route table memory having a set of accessible locations for storing routing information, the set of accessible locations being addressable in response to N bits, and locations in the set storing a tag comprising M bits for identifying a network flow, and storing network layer routing information for the network flow;

a plurality of flow detect filters, the flow detect filters including respectively a read/write template register which stores a mask for a particular network frame format, logic applying the mask to the incoming frame to generate a hash seed value from the incoming frame, a read/write protocol filter register which stores a protocol filter identifying a protocol for which the template register is adapted, mask enable logic responsive to the protocol filter which enables the logic applying the mask in response to processing the incoming frame with the protocol filter, a pseudo random number generator responsive to the hash seed which generates a hash, and a read/write protocol hierarchy register which stores a protocol hierarchy value identifying a priority for the protocol for which the template register is adapted;

a selector, coupled with the plurality of flow detect filters, which selects a hash from the plurality of flow detect filters as a hash value in response to the protocol hierarchy values, and applies N bits of the hash value as an N bit address, and M bits of the hash value as an identifying tag for use in accessing the route table memory in response to an incoming frame, where M plus N is 32 or greater; and match logic, coupled with the route table memory and the flow detect logic, which accesses a particular location in the set of accessible locations in the route table memory in response to the N bit address, compares the identifying tag with the tag stored in the particular location to determine whether the incoming frame matches the network flow identified by the stored tag, and supplies the routing information stored in the particular location if a match occurs, else signals a route table miss.

20. The network switch of claim 19, wherein M plus N is 64 or greater.

\* \* \* \* \*